US006835861B2

(12) United States Patent
Nichols et al.

(10) Patent No.: US 6,835,861 B2
(45) Date of Patent: Dec. 28, 2004

(54) LOW ENERGY METHOD OF PYROLYSIS OF HYDROCARBON MATERIALS SUCH AS RUBBER

(75) Inventors: Ronald E. Nichols, Evergreen, CO (US); Alan M. Levine, Monroeville, PA (US); Jules E. Langlois, New Kensington, PA (US)

(73) Assignee: RJ Lee Group, Inc., Monroeville, PA (US)

( * ) Notice: Subject to any disclaimer, the term of this patent is extended or adjusted under 35 U.S.C. 154(b) by 0 days.

(21) Appl. No.: 09/925,391

(22) Filed: Aug. 9, 2001

(65) Prior Publication Data

US 2002/0072640 A1 Jun. 13, 2002

Related U.S. Application Data

(63) Continuation-in-part of application No. 09/925,401, filed on Aug. 9, 2001.
(60) Provisional application No. 60/224,405, filed on Aug. 10, 2000, and provisional application No. 60/224,029, filed on Aug. 10, 2000.

(51) Int. Cl.[7] .............................. C07L 4/06; C10G 9/00
(52) U.S. Cl. ...................... 585/241; 208/106; 208/125; 208/126
(58) Field of Search .................. 585/241; 208/106, 208/125, 126

(56) References Cited

U.S. PATENT DOCUMENTS

| | | | |
|---|---|---|---|
| 1,680,980 A | 8/1928 | Nishida et al. | |
| 4,250,158 A | 2/1981 | Solbakken et al. | |
| 4,300,009 A | 11/1981 | Haag et al. | |
| 4,432,890 A | 2/1984 | Beck et al. | |
| 4,463,203 A | 7/1984 | Gi | |
| 4,740,270 A | 4/1988 | Roy | |
| 4,948,495 A | 8/1990 | Coburn | |
| 4,977,839 A | 12/1990 | Fochtman et al. | |
| 4,983,278 A | * 1/1991 | Cha et al. | 208/407 |
| 5,087,375 A | 2/1992 | Weinwurm | |
| 5,114,541 A | 5/1992 | Bayer | |
| 5,230,777 A | 7/1993 | Jarrell | |
| 5,233,109 A | 8/1993 | Chow | |
| 5,354,930 A | 10/1994 | Atkins et al. | |
| 5,359,061 A | 10/1994 | Evans et al. | |
| 5,411,714 A | 5/1995 | Wu et al. | |
| 5,555,823 A | 9/1996 | Davenport | |
| 5,618,407 A | 4/1997 | Kallenbach et al. | |
| 5,662,052 A | 9/1997 | McIntosh et al. | |
| 5,711,235 A | 1/1998 | May et al. | |
| 5,720,232 A | 2/1998 | Meador | |
| 5,744,668 A | 4/1998 | Zhou et al. | |
| 5,783,046 A | 7/1998 | Flanigan | |
| 5,820,736 A | 10/1998 | Bouziane et al. | |
| 5,894,012 A | 4/1999 | Denison | |
| 6,063,355 A | 5/2000 | Fujimura et al. | |
| 6,170,411 B1 | 1/2001 | An | |
| 6,210,562 B1 | 4/2001 | Xie et al. | |
| 6,221,329 B1 | 4/2001 | Faulkner et al. | |

* cited by examiner

Primary Examiner—Thuan Dinh Dang
(74) Attorney, Agent, or Firm—Debra Z. Anderson; Arnold B. Silverman; Eckert Seamans Cherin & Mellott, LLC

(57) ABSTRACT

A low energy method of pyrolysis of rubber or other hydrocarbon material is provided. The hydrocarbon material is heated while maintaining a vacuum, using a clay catalyst. In an additional embodiment, the temperature of the reaction chamber and corresponding fuel input is varied either over time or spatially within the reaction chamber, to take advantage of the exothermic properties of the reaction. With the method of the present invention, a higher quality solid reaction product can be achieved, as well as a liquid having reduced polyaromatic hydrocarbons and oxidized organic contaminants.

27 Claims, 4 Drawing Sheets

FIGURE 4. Schematic Drawing of Activation and Reaction Energies for Catalyst Versus No Catalyst.
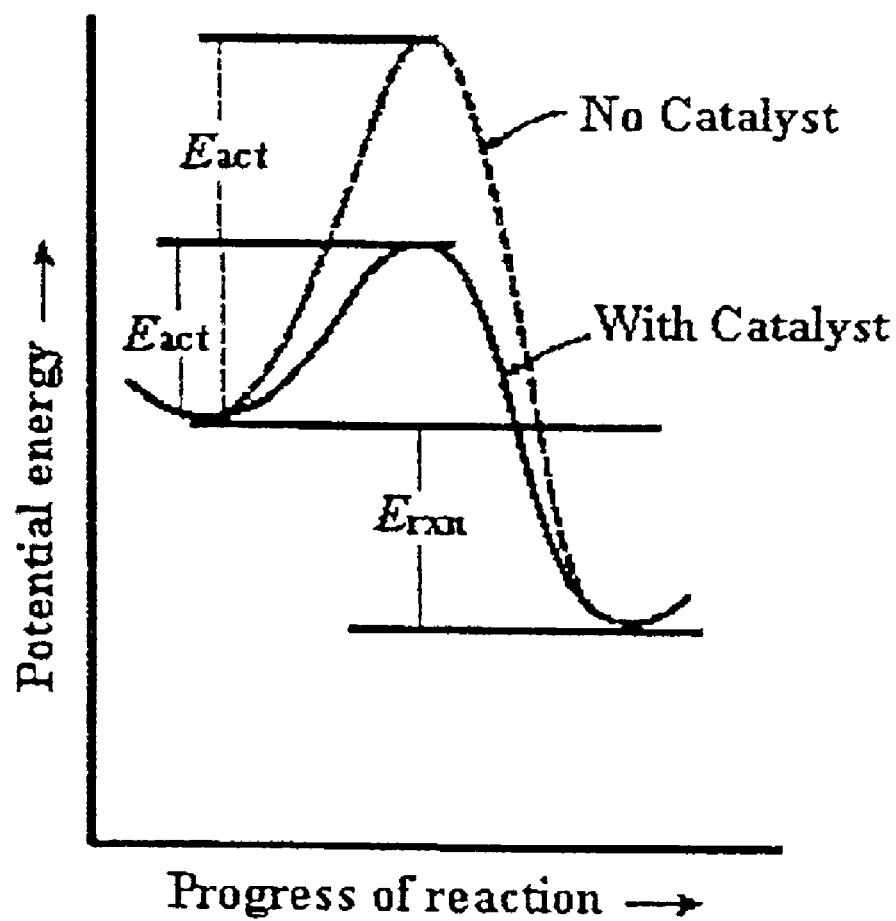

LOW ENERGY METHOD OF PYROLYSIS OF HYDROCARBON MATERIALS SUCH AS RUBBER

CROSS-REFERENCE TO RELATED APPLICATIONS

This application is a continuation-in-part of U.S. patent application Ser. No. 09/925,401 entitled "Low Energy Method of Pyrolysis of Hydrocarbon Materials such as Rubber", filed Aug. 9, 2001, which claims priority under 35 U.S.C. §119(e) to provisional application Ser. No. 60/224, 405, filed Aug. 10, 2000, and provisional application Ser. No. 60/224,029, filed Aug. 10, 2000.

FIELD OF THE INVENTION

The present invention relates to a low energy method of pyrolysis of hydrocarbon materials such as rubber, coal, tar sands and the like. The method uses a clay catalyst and negative pressure to achieve lower energy input requirements, and produces improved solid carbonaceous material, oil, and combustible gas products. The system design profiles the energy input to take advantage of the exothermic reaction and optimize the required energy.

BACKGROUND INFORMATION

In the United States, each resident discards approximately one waste tire annually. Discard of tires resulted in accumulation of approximately 242 million wasted tires nationwide in 1990 alone, exclusive of retreads. Waste tires are a minor portion of the solid waste stream yet represent a major disposal problem. While many waste tire incinerators have been designed, incineration may not maximize the potential economic recovery of energy and chemical materials from the tires.

Most tires are disposed of in landfills or in tire storage piles. However, whole waste tires are difficult to dispose of in landfills; they tend to collect gas, harbor rodents, snakes, and mosquitoes, pose a fire hazard, and drift upward in the landfill over time as other wastes consolidate and subside. Nonetheless, landfilling, stockpiling, or illegal disposal continue to be the primary methods of waste tire management.

Pyrolysis involves heating organic materials in the absence of oxygen to convert them to molecularly simpler and smaller organic compounds. When organic wastes such as waste tires are the feedstock, products of the process include char or carbon black, oil and gas. As early as 1830, a developer successfully commercialized an early application of pyrolysis involving the production of liquid products from wood. The production of coke from coal pyrolysis became the most common application of the technology; its use continues today. The use of wood pyrolysis to manufacture creosote oil expanded after the introduction of creosote as a wood preservative in 1838. Pyrolysis of coal and oil shales became common to produce oils in the United States and elsewhere in the mid-1800's. Pyrolysis plants to produce illuminating gas became common worldwide until the invention of the electric light bulb in 1879.

Pyrolysis processes may operate either as batch feed or continuous feed systems. Batch feed systems process a single charge of feed stock at one time. After the required residence time in the batch thermoreactor, solid products and residue are removed. Alternatively, in continuous feed systems, feed stock is conveyed through the thermal reactor, and solid products and residue are continuously discharged.

Pyrolysis relies on the addition of heat to break chemical bonds, providing a mechanism by which organic compounds decompose and vaporize. Most systems for pyrolysis of waste rubber and other hydrocarbons report operating temperatures in the range of about 480° F. to 1740° F. At temperatures above approximately 480° F., shredded tires release increasing amounts of liquid oil products and gases. Above 750° F., depending on the process employed, the yield of oil and solid tire derived char may decrease relative to gas production. Tires contain over 80% carbon and hydrogen, and these elements form the principle constituents of the solid, liquid and gaseous pyrolysis products. In addition to carbon-carbon bonds, decomposition of tires requires the breakage of sulfur-carbon and sulfur-sulfur bonds.

The solid product produced by most pyrolysis processes that use tires or other solid organic feed stocks is termed "tire derived char", "tire derived carbon char", or carbon black. This solid product can be further processed and cleaned to produce a higher grade of carbon black, or it can be marketed directly. Carbon blacks differ in particle size, surface area, average aggregate mass, particle and aggregate mass distributions, structure and chemical composition, and are rated according to industry standards, based on these properties. Conformity with industry standards determines the marketability of the tire derived carbon black. For example, intermediate quality virgin (un-recycled) carbon black is usually used in rubber products, while lower grades are used in products such as hoses and solid (not steel-belted) rubber tires. High purity carbon blacks are used in toner and for electronic sensors.

The surface area of carbon black has a substantial impact on quality and applications; carbon blacks containing sub-micron particles have a high surface area to volume ratio. The average particle size of a commercial carbon black ranges from approximately 5000 Å for a low cost thermocarbon to approximately 100 Å for the most expensive high color paint carbon. Also important is structure, as measured by aggregate size and shape, the number of particles per aggregate, and their average mass. These characteristics affect aggregate packing and the volume of voids in the bulk material. Void volume is one of the standards by which carbon black grades are judged.

Typically, tire-derived carbon chars produce carbon blacks having particles in the size range of 10 to 100 microns. This particle size range limits the ability of the material to be substituted for standard, less variable, carbon blacks containing submicron particles. However, there are some applications which use carbon black grades containing larger particle sizes, for example, use in plastics to improve weathering resistance, or to impart antistatic and electrically conductive properties. Char or carbon char material generated from pyrolysis can also be used as a source of fuel.

Tire pyrolysis also produces a gas that contains combustible concentrations of butane, propane, methane and ethane. Due to large amounts of carbon monoxide and carbon dioxide in the gas, the gas cannot be blended with natural gas for sale. Tire pyrolysis systems can also generate an oil-based liquid similar to Number 6 grade fuel oil; the liquid constitutes approximately 30% to 50% of the product derived from the organic content of the tire feed stock. Due to the high temperature and absence of hydrogen in the reaction mixture, most rubber pyrolysis methods produce a liquid that is high in polyaromatic hydrocarbons (PAH); these compounds are detrimental when released in the environment.

Many methods of pyrolysis have been described in the art using clay as a catalyst or non-sticking agent. See, for example, U.S. Pat. Nos. 1,680,908; 4,463,203; 4,300,009; 4,948,495; 5,114,541; 5,354,930; 5,233,109; and 5,114,541. These methods use high temperatures, in the range of 200°–800° C. (392°–1492° F.), and do not use negative pressure/vacuum conditions. Other patents have attempted to fine tune the pyrolysis process to favor production of certain products over others; see, for example, U.S. Pat. No. 5,359,061, which discloses pyrolysis of elastomers such as rubber tire scraps using molecular beam mass spectrometry techniques to detect decomposition products and to determine process parameters.

While some patents disclose the use of vacuum conditions, none disclose use of a vacuum in combination with the use of a catalyst. See, for example, U.S. Pat. No. 5,720,230 which provides a method of pyrolysis for discarded rubber tires, using temperatures between about 350° F. and 650° F., under slight vacuum conditions of one half to one inch mercury; and U.S. Pat. No. 4,740,270, which discloses treatment of used rubber tires by vacuum pyrolysis, at a temperature range of about 360° C. to 415° C. (680°–779° F.) under subatmospheric pressure conditions.

In most prior art methods the carbon black derived from pyrolysis of rubber tires does not meet the industry standards as to particle size, purity and the like. None of the above described methods of pyrolysis of rubber tires and hydrocarbons generally are accomplished at lower temperatures and yet able to produce a higher quality of carbon black and liquid oil low in polyaromatic hydrocarbons as reaction products.

SUMMARY OF THE INVENTION

The present invention solves the above need by providing a low energy method of pyrolysis of hydrocarbon material, including rubber, in which the hydrocarbon material is heated under vacuum conditions, using a clay and metal catalyst. With the method of the present invention a higher quality of solid reaction products can be achieved; carbon black is released from the rubber tires, rather than being created during the pyrolytic process. The liquid oil produced by the method of the present invention has reduced amounts of polyaromatic hydrocarbons and partially pyrolyzed rubber and hydrocarbon material as compared with other methods. The addition of a catalyst, in combination with negative pressure conditions, allows the process to proceed at a more rapid rate than other prior art methods. In addition, by drawing the oil and gases to the surface of the rubber during the course of the reaction, the oil and gases are more easily removed from the system. Use of a clay catalyst provides reactive sites within layers of the clay wherein the sites can share electrons with carbon and sulfur molecules in the rubber molecules. This sharing of electrons strains the adjacent carbon-carbon, carbon-sulfur, and/or sulfur-sulfur bonds, destabilizing them and decreasing the energy, and thus the temperature required to promote thermal cracking. The breakage of the bonds involves either free radical formation, ion formation or polarization or a combination of these. Additionally, the catalyst causes steric strain on the bonds which makes them more susceptible to cleavage. The use of metal dust in combination with clay further enhances the reaction.

In an additional aspect of the invention, pyrolysis of the hydrocarbon material occurs under vacuum conditions in at least a first, a second and a third phase. By taking advantage of the exothermic nature of the reaction, only as much energy as is required is inputted into the system, preferably in the first and third phases. As the reaction progresses, and particularly during the middle phase of the reaction, less fuel is required to maintain the desired reaction temperature. Thus the fuel input is adjusted over time, providing at least three phases sequentially in time, or spatially inside the reaction chamber.

When a continuous pyrolytic process is used, the fuel input or temperature is varied spatially within the reaction chamber. The rubber or hydrocarbon material moves through the reaction chamber by means of a helicoid auger or other similar device. In the inlet portion of the reaction chamber, corresponding to the first phase of the reaction (the "activation phase"), higher heat input is required to initiate and overcome the activation energy of the reaction, and the inlet portion of the reaction chamber is heated accordingly. The rubber or hydrocarbon material is moved from a first location in the chamber to a second, intermediate location, corresponding to the second phase (the "decomposition phase") of the reaction, where the reaction is exothermic and less heat (fuel) input is required to ensure progress of the reaction. Finally, the rubber or hydrocarbon material is moved to a third location corresponding to the third phase (the "completion phase") of the reaction, where the reaction nears completion and slows, and fuel input is increased to complete the pyrolysis process.

It is an object of the present invention, therefore, to provide a low energy method of pyrolysis of rubber, tar sands, coal or other hydrocarbon materials.

It is an additional object of the present invention to provide a low energy method of pyrolysis, using vacuum conditions and a catalyst.

It is an additional object of the present invention to provide a low energy method of pyrolysis which produces higher quality reaction products.

It is a further object of the invention to provide a low energy method of pyrolysis in which the fuel input is varied over time or spatially to take advantage of the exothermic nature of the reaction.

It is also an object of the present invention to provide an environmentally safe method of recycling rubber tires and other hydrocarbon materials.

These and other objects of the invention will be readily apparent from the following detailed description and appended claims.

BRIEF DESCRIPTION OF THE FIGURES

The invention is further illustrated by the following non-limited drawings in which:

FIG. 4 shows the activation and reaction energies of the reaction with and without a catalyst.

DETAILED DESCRIPTION OF PREFERRED EMBODIMENTS

The present invention provides a low energy method of pyrolysis of hydrocarbon material comprising providing hydrocarbon material; loading the hydrocarbon material into a reaction chamber; adding a clay and metal dust catalyst to the reaction chamber; and heating the reaction chamber. This method occurs under vacuum conditions and yields reaction products comprising a substantially non-charred and non-oxidized solid residue having minimal unpyrolized material, a substantially non-oxidized and polyaromatic hydrocarbon-free liquid hydrocarbon product and a combustible gas.

The catalyst in the present invention is a clay-metal dust combination which further reduces the amount of heat input required to complete the reaction, as compared with use of a clay catalyst alone. Aluminum (Al) and/or magnesium (Mg) metal dust are added to the clay to enhance the reaction. As used herein, "dust" refers to a particle size that is less than about 325 mesh for Mg and less than about 200 mesh for Al. While either metal can be used alone in combination with the clay, a preferred combination uses both metals. Typically, the metal dust will be added in a ratio of about [0.1 to 2]:[0.1 to 2]:[8] ([Al]:[Mg]:[Clay]). The preferred ratio is about 1:1:8. The metal is mixed with the clay prior to application to the hydrocarbon materials. Due to the similar densities of the three components, the mixture will not segregate during shipping and storage. Also, the dilution effected by the clay decreases any ignition hazard of the metal dusts. It is thought that the addition of metal dust enhances the reaction due to the metals scavenging the small amount of oxygen in the system and generating heat to promote the reaction, although the inventors do not wish to be bound by this. Additionally, the metals could be catalyzing the water-gas and other reactions to generate free hydrogen, which will be available to complete the cracking reaction. When metal dust is added the heat generated by the reaction occurs earlier in the process and is maintained for a longer time period and less heat input is required. The reaction proceeds further towards completion with less final phase heating required. Since the maximum temperature and pressure remain similar to the catalyst without the metals the products are not compromised by this catalyst-metal mixture.

Figure 1:
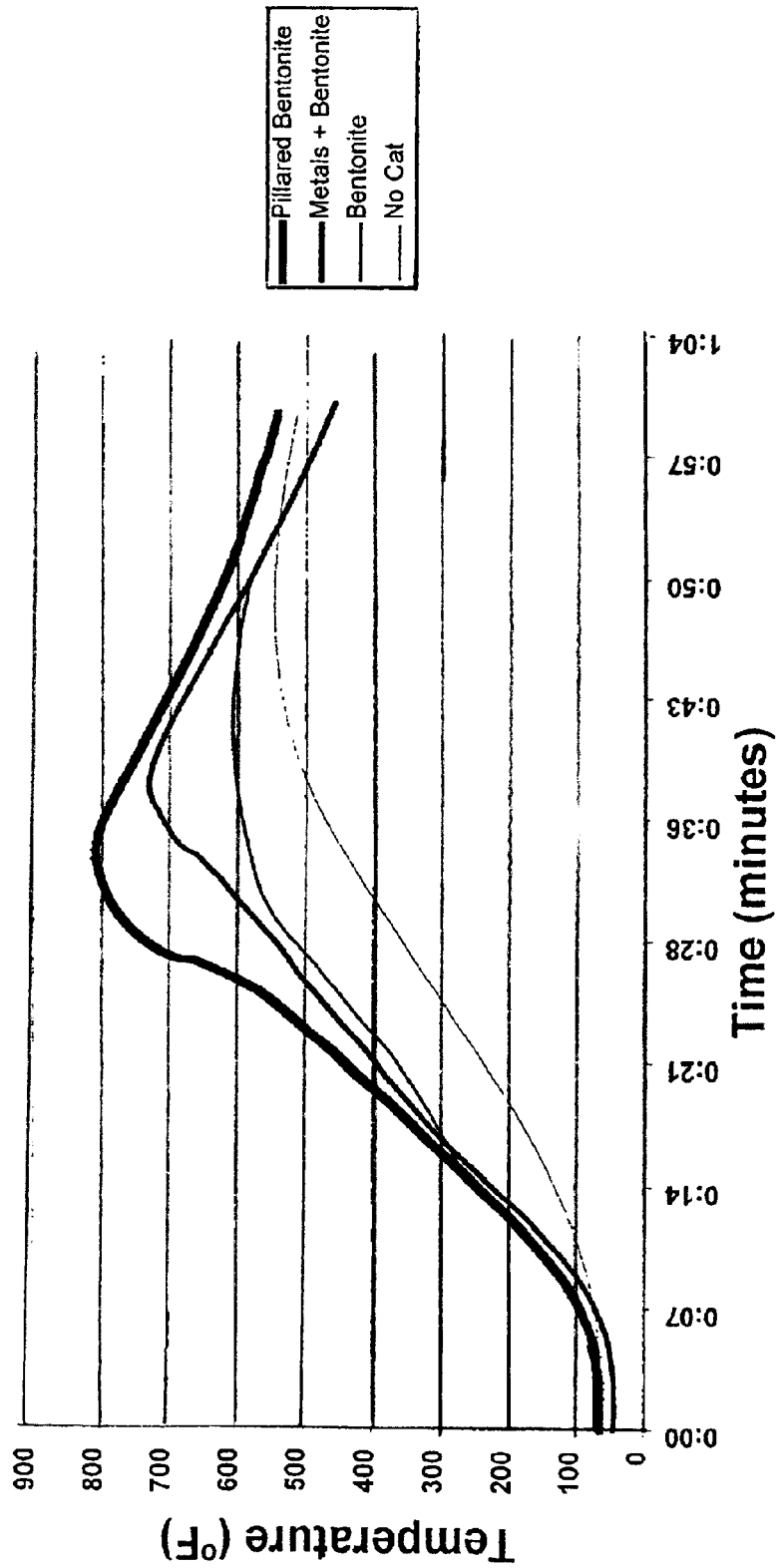
FIG. 1 shows temperature profiles of the reaction using clay alone, clay in combination with metal dust, and pillared clay as catalysts.

FIG. 1 illustrates the temperature profiles in a batch system of the reaction using pillared clay, metals and clay (bentonite) and clay alone as catalysts. As can be seen in FIG. 1, the reaction temperature of the hydrocarbon material increases with the use of pillared clay or metals and clay as catalysts, as compared with no catalyst or the use of clay alone. The energy optimization described can be applied in both batch and continuous reactor configurations.

As used herein, the term "clay" refers to the naturally occurring material comprising hydrated aluminum silicates in a layered structure and belonging to a general class of materials known as smectite. Smectite ores such as bentonite, and specific clay minerals such as montmorillonite and beidellite are included within the scope of the present invention. Also included are commercial products containing these clays such as cat litter or oil spill absorbent. These clays in combination with various counter ions, including hydrogen (H-form), sodium (Na-form), various metals (e.g. Al-form), and organic cations are also contemplated as being within the present invention.

Bentonite can also be modified by the introduction of metal hydroxide "pillars" between the layers. Pillaring clay is a process by which molecules are bound within the layers of clay to prop them open, making the clay more stable at higher temperatures and allowing interaction with larger molecules. Pillared clay is a more effective catalyst because the catalyst is stable over a larger temperature range. The term "clay" refers to any of the above materials, including those not specifically listed yet known to those skilled in the art. Preferred clays for use as a catalyst in the method of the present invention are smectites; most preferred is montmorillonite.

Typically, the clay and metal dust catalyst will be added in an amount of between about 0.01 to 3.0 wt %, based on the total weight of the rubber or hydrocarbon material. Preferably, the catalyst is added in an amount of between about 0.2 to 1.0 wt %.

As used herein, the terms "negative pressure conditions" or "vacuum conditions" refer to the use of a vacuum in which the pressure is below atmospheric. A preferred vacuum setting is about 2 to 16 inches mercury; most preferred is about 5 to 10 inches mercury.

The non-charred carbonaceous residue containing little un-pyrolyzed rubber, produced by the methods of the present invention, is distinguishable from that produced in prior art methods. For example, the carbon black produced by the present methods has no detectable PAH's, less than about 15–20% unpyrolyzed rubber, and no oxidized organic contaminants as compared with significant levels of these contaminants in prior art products. An analysis of commercial standard black, IRB6, by Fourier Transform Infrared Spectroscopy (FTIR) confirmed the presence of more than 0.1% PAH's in such products. The current process, when operated without catalysts, produces product with over 70% un-pyrolyzed rubber and when operated at positive pressure generates product with significant amounts of oxidized organic contaminants, for example terephthalic acid. As used herein, the term "minimal un-pyrolyzed rubber" will refer to a solid residue having less than about 20% unpyrolyzed hydrocarbon material.

The liquid oil produced by the methods of the present invention also shows improved properties over oils produced in prior art methods. The oil produced by the present methods has decreased amounts of polyaromatic hydrocarbons and oxidized organic contaminants. It is also lighter in weight than oils generated by other prior art processes.

In one embodiment, when operation is in batch mode, the temperature of the reaction occurs between about 140° F. and 850° F. in the first or activation phase, preferably initiating below 155° F. and peaking about 550° F. The temperature of the reaction is monitored by inserting a measuring device into the rubber or hydrocarbon material itself; constant energy is added to the system throughout the activation phase until oil condensation initiates at which time the heating is reduced or ceased. During the next (second) phase of the reaction, little or no fuel input is required due to the exothermic nature of the reaction., and the reaction temperature rises from about 550° F. to 850° F. or greater even in the absence of fuel input. Near the end of the decomposition phase of the reaction, the reaction slows and the temperature starts to decrease, during which time an increase in fuel is necessary to complete the pyrolytic process. Heating is resumed after the reaction temperature peaks and starts to decline and is continued until completion is noted by leveling of the temperature. In this configuration 25% less fuel is used with catalyst than without catalyst. An electronic feedback system or, in the case of a continuous helicoid reactor, a system that transfers heat from the exothermic region can be developed to automatically adjust the fuel input based on the reaction temperature.

Figure 2:
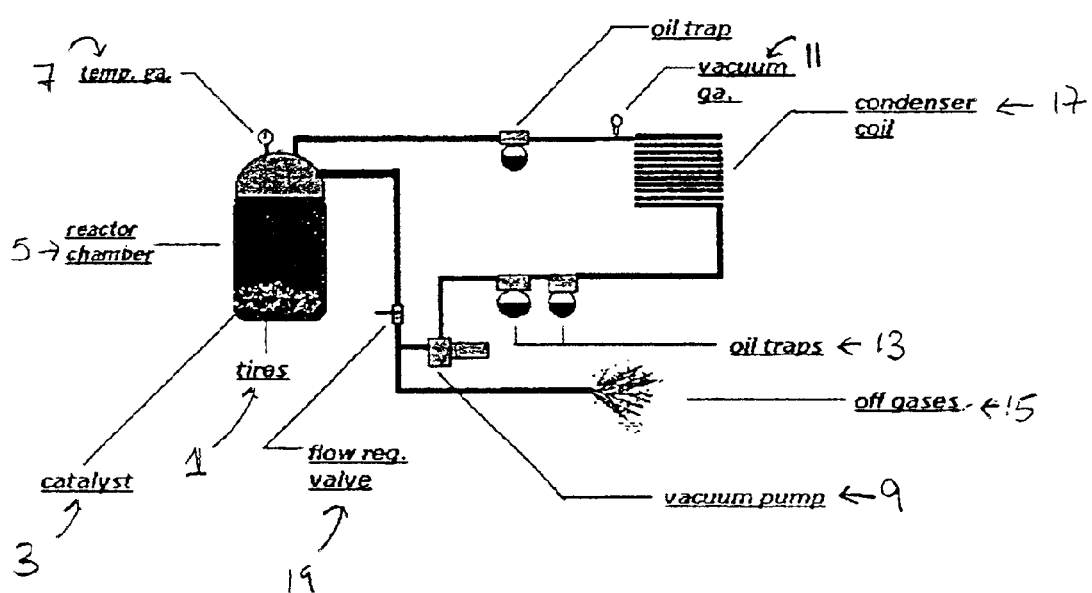
FIG. 2 shows a simple pyrolytic chamber and apparatus for drawing off liquid, solid and gaseous products of the reaction.

FIG. 2 shows an embodiment of a pyrolytic reaction chamber and batch apparatus in which liquid, gaseous and solid reaction products are removed during the pyrolytic process, according to the methods of the present invention. Rubber tires 1 and a catalyst 3 are placed in the reactor chamber 5 and subjected to heat as measured by the temperature gauge 7, which monitors the heat of the reaction. A vacuum pump 9 maintains a negative pressure throughout the system, as measured by the vacuum gauge 11. Oil traps 13 collect oil produced by the reaction, while gases are vented off 15. A condenser coil 17 condenses the oil, and the flow valve regulator 19 controls the reactor atmosphere and vacuum level. Solid products remain in the reactor chamber 5 where they can be collected after completion of the reaction.

In a further embodiment, in a continuous pyrolytic process, the temperature/fuel input can be varied spatially within the reaction chamber. First, the hydrocarbon material, at ambient temperature, moves from feeder bins into an initial temperature zone in the reactor that controls the heat input required to overcome the activation energy of the reaction. In the inlet portion of the reaction chamber, corresponding to the first phase of the reaction, higher heat input is required to initiate the reaction, and the inlet portion of the reaction chamber is heated accordingly, with heat input increasing until a reaction temperature of between about 450°–850° F. is reached, more preferably a temperature of between about 500°–600° F., most preferably about 550° F., for a period adequate to initiate a pyrolysis reaction as indicated by initiation of production of oil. The rubber or hydrocarbon material moves through the reaction chamber by means of a helicoid auger or other similar device, and is moved from the first location in the chamber to a second, intermediate location, corresponding to the second phase of the reaction, where lower fuel input is required to maintain the reaction temperature at between about 450°–850° F., more preferably a temperature of between about 500°–600° F., most preferably about 550° F., and ensure progress of the reaction for a period adequate to continue the pyrolytic reaction, as indicated by the generation of heat. Finally, the rubber or hydrocarbon material is moved to a third location corresponding to the third phase of the reaction, and heat input is increased to maintain a reaction temperature of between about 450°–850° F., more preferably a temperature of between about 500°–600° F., most preferably about 550° F., for a period adequate to complete the pyrolysis process, as indicated by a leveling of the temperature. The temperature of the reaction is measured at the center of the auger, and fuel input is adjusted to maintain the desired reaction temperatures and to take advantage of the exothermic nature of the reaction.

A feeder and recovery system removes the gases from the controlled low temperature reactor chamber, yet allows it to continuously operate under a vacuum. As described above, an electronic feedback system can be developed to automatically adjust the fuel input based on the reaction temperature.

Figure 3:
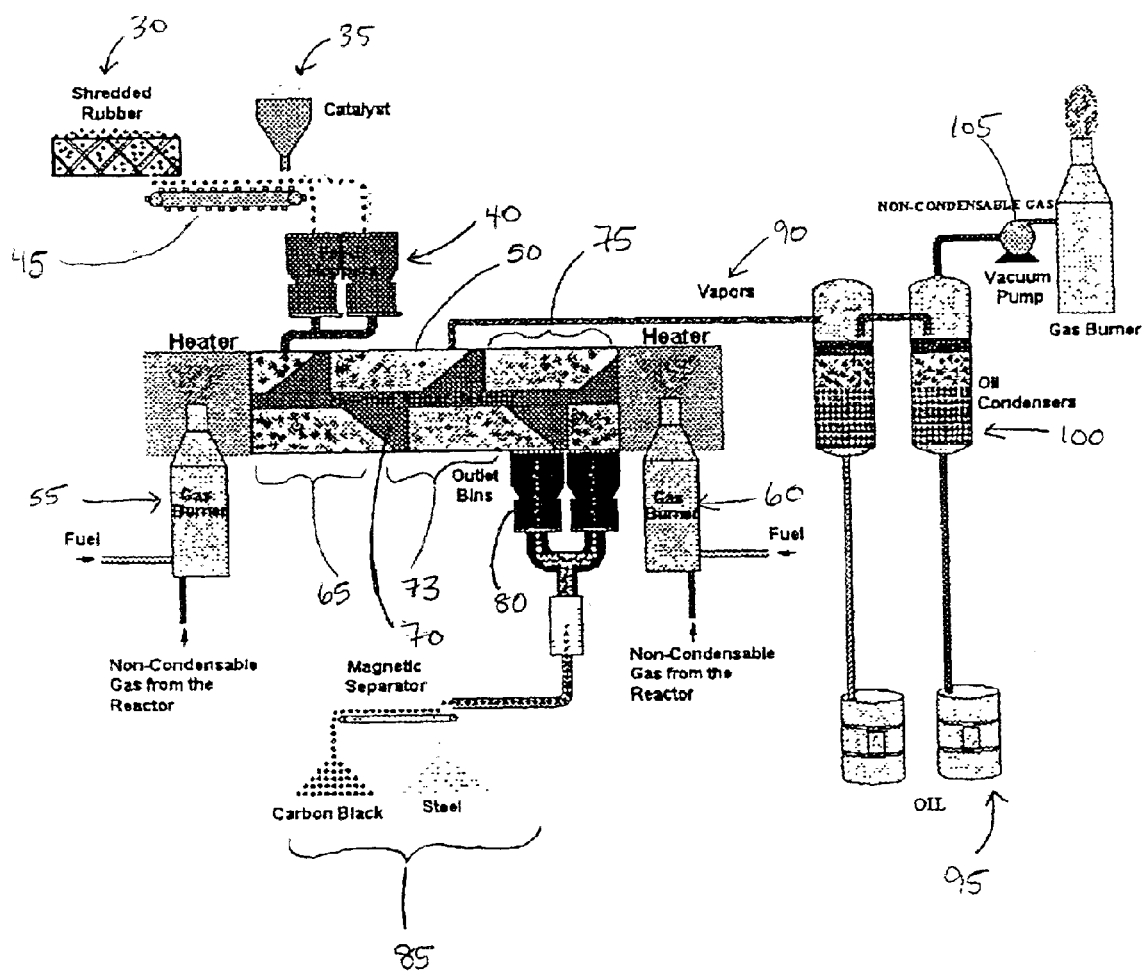
FIG. 3 shows a continuous feed pyrolytic chamber and apparatus for drawing off liquid, solid and gaseous products of the reaction.

An example of a continuous feed system is shown in FIG. 3. Shredded rubber 30 or other hydrocarbon material and a catalyst 35 are moved into inlet bins or feed hoppers 40 by means of a conveyor belt 45 or other similar apparatus. The elongated reaction chamber 50 is heated at both ends by gas burner 55 and gas burner 60. The hydrocarbon material is heated in the activation zone 65, and then moves by means of a helicoid auger 70 to the decomposition zone 73, where the exothermic portion of the reaction occurs. As the reaction slows, the hydrocarbon material is moved by means of the auger to the completion zone 75, after which solid residue moves into the outlet bins 80 to a solid material recovery system 85 to yield carbon black and steel, if initially present. Vapors 90 are continuously drawn off and condensed into oil 95 by a heat exchanger or oil condensers 100 or burned as fuel during the reaction. A vacuum pump 105 draws off the vapors and maintains a vacuum during the course of the reaction.

By knowing the energy requirements for activation of this reaction and the kinetics of energy production of this reaction (as shown in FIG. 4), a spatially variable reactor which controls the energy added to the reactant materials as they move through the reactor can be designed. In addition, since the gas produced contains manageable levels of contaminants, it is collected and added back to the system when needed. This design takes advantage of the thermodynamics of the reaction and is economical.

EXAMPLE

The following example is intended to illustrate the invention and should not be construed as limiting the invention in any way.

Two pounds of rubber tires were loaded into a batch pyrolytic chamber having a 21 quart capacity, and 10 grams of a mixed metal catalyst consisting of aluminum, magnesium and bentonite in a mass ratio of 1:1:8 was dispersed over the rubber. The reactor was heated with LPG fuel burned at a rate of 16 l/min until oil condensate was produced and the reaction temperature reached 550° F. in the first phase, as determined by a thermocouple placed in a piece of rubber in the chamber. The LPG flow was turned off at this point. The temperature continued to rise through the heat generated by the exothermic reaction until the temperature reached 750° F. in the second phase. During the process the combustible gas product was observed by flaring with a pilot light to be within ignitable levels for approximately 20 minutes. The carbon black produced composed greater than 74% of the solid product. The oil product was equivalent to number 6 grade fuel oil. Eighty such experimental tests were performed with similar results. Side-by-side comparative tests performed without catalyst produced little or no gas or oil and solid product consisting of less than 20% carbon black.

Whereas particular embodiments of this invention have been described above for purposes of illustration, it will be evident to those skilled in the art that numerous variations of the details of the present invention may be made without departing from the invention as defined in the appending claims.

What is claimed is:

1. A low energy method of pyrolysis of hydrocarbon material comprising:
   providing said hydrocarbon material;
   loading said hydrocarbon material into a reaction chamber;
   adding a clay catalyst and an elemental metal dust catalyst to said reaction chamber, and
   heating said reaction chamber for a sufficient tune to provide substantially complete pyrolysis,
   said method occurring while maintaining a vacuum in said reaction chamber and yielding reaction products comprising a substantially non-charred and non-oxidized carbon black having minimal unpyrolyzed material, a substantially non-oxidized and polyaromatic hydrocarbon-free liquid hydrocarbon product and a combustible gas.

2. The method of claim 1, wherein said clay is selected from the group consisting of montmorillonite, bentonite, beidillite and combinations thereof.

3. The method of claim 1, wherein said clay is pillared clay.

4. The method of claim 1, wherein said clay is a natural ore.

5. The method of claim 1, wherein said clay is a commercial clay containing product.

6. The method of claim 5, wherein said commercial clay product is selected from the group consisting of cat litter and oil spill absorbent and combinations thereof.

7. The method of claim 1, wherein said clay and metal dust catalyst is added in an amount of about 0.01 wt. % to 3.0 wt. %, based on the total weight of said hydrocarbon material.

8. The method of claim 1, wherein the metal dust is added to the clay in a ratio of between about [0.1 to 2]:[0.1 to 2]:[8] of [Al] [Mg] [clay].

9. The method of claim 1, wherein said metal dust is added in a ratio of between about [0.5 to 1]:[0.5 to 1]:[8] of [Al] [Mg] [clay].

10. The method of claim 1, wherein said metal dust is comprised of a mixture of aluminum and magnesium.

11. The method of claim 1, wherein said metal dust is comprised of aluminum or magnesium.

12. The method of claim 1, wherein said metal dust comprises Al particles of less than about 200 mesh size and Mg particles of less than about 325 mesh size.

13. The method of claim 1, wherein said heating of said reaction chamber results in a reaction temperature of said hydrocarbon material of between about 150° to 850° F.

14. The method of claim 13, wherein said reaction temperature of said hydrocarbon material is maintained for a period of time sufficient to complete pyrolysis.

15. The method of claim 1, wherein said heating occurs in at least a first, second and third phases and fuel input is adjusted to take advantage of the exothermic nature of the reaction.

16. The method of claim 15, wherein said heating in said first phase maintains a reaction temperature of between about 450°–850° F., for a period of time adequate to initiate pyrolysis.

17. The method of claim 15, wherein said heating in said second phase maintains a reaction temperature of between about 450°–850° F., for a period of time adequate to provide continued pyrolysis.

18. The method of claim 15, wherein said heating in said third phase maintains a reaction temperature of between about 450°–850° F., for a period of time adequate to provide completion of pyrolysis.

19. The method of claim 15, wherein said first, second and third phase occur sequentially over time.

20. The method of claim 15, wherein said first, second and third phase occur sequentially over space, as said hydrocarbon material moves through said reaction chamber.

21. The method of claim 1, wherein said vacuum is maintained at a pressure of between about 2 inches to 16 inches mercury.

22. The method of claim 15, wherein said vacuum is maintained at pressure of between about 2 inches to 16 inches mercury.

23. The method of claim 1, wherein said vacuum is maintained at a pressure of between about 5 inches to 10 inches mercury.

24. The method of claim 15, wherein said vacuum is maintained at pressure of between about 5 inches to 10 inches mercury.

25. The method of claim 1, wherein said hydrocarbon material is used rubber.

26. The method of claim 1, wherein said hydrocarbon material is tar sands.

27. The method of claim 1, wherein said hydrocarbon material is coal.

\* \* \* \* \*